United States Patent [19]

Furuta

[11] 4,093,882
[45] June 6, 1978

[54] CORELESS MOTOR

[75] Inventor: Kenji Furuta, Hachioji, Japan

[73] Assignee: Olympus Optical Company Limited, Tokyo, Japan

[21] Appl. No.: 595,400

[22] Filed: Jul. 14, 1975

[30] Foreign Application Priority Data

| Jul. 13, 1974 | Japan | 49-83082[U] |
|---|---|---|
| Jul. 24, 1974 | Japan | 49-88031[U] |
| Jul. 31, 1974 | Japan | 49-91509[U] |
| Aug. 6, 1974 | Japan | 49-93863[U] |
| Dec. 17, 1974 | Japan | 49-153568[U] |
| Dec. 27, 1974 | Japan | 50-266[U] |
| Dec. 27, 1974 | Japan | 50-270[U] |
| Dec. 27, 1974 | Japan | 50-271[U] |
| Apr. 17, 1975 | Japan | 50-52577[U] |
| Jun. 6, 1975 | Japan | 50-76638[U] |
| Jul. 19, 1974 | Japan | 49-83014 |
| Jul. 26, 1974 | Japan | 49-85642 |

[51] Int. Cl.² .................................... H02K 1/22
[52] U.S. Cl. .................... 310/268; 310/209; 310/154; 310/90
[58] Field of Search ............ 310/153, 207, 154, 208, 310/156, 161, 268, 157, 152, 162, 209, 163, 164, 103, 105, 104, 107, 108, 110, 90, 198, 203, 206, 191

[56] References Cited

U.S. PATENT DOCUMENTS

| 2,804,557 | 8/1957 | Roters | 310/90 |
|---|---|---|---|
| 2,806,158 | 9/1957 | Emery | 310/103 |
| 3,038,765 | 6/1962 | Tupper | 310/90 |
| 3,171,356 | 3/1965 | Pensabene | 310/268 |
| 3,333,129 | 7/1967 | Kohlhagen | 310/164 |
| 3,512,025 | 5/1970 | Quelett | 310/154 |
| 3,525,005 | 8/1970 | Beyers | 310/268 |
| 3,790,835 | 2/1974 | Takeda | 310/268 |
| 3,936,680 | 2/1976 | Kuwako | 310/154 |
| 3,936,685 | 2/1976 | Glockner | 310/209 |
| 3,965,380 | 6/1976 | Stepina | 310/209 |

Primary Examiner—R. Skudy
Attorney, Agent, or Firm—Flynn & Frishauf

[57] ABSTRACT

Disclosed is a coreless motor comprising a rotor having a plurality of flat-type loop coils arranged on a rotor substrate, a motor housing having a journal bearing for rotatably supporting said rotor, and a stator which includes a pair of permanent magnets disposed facing said rotor in said motor housing, characterized in that the angle θ of said flat-type loop coil flared toward itself from the rotor axis is so set as to satisfy the inequality:

$$\theta > \frac{360°}{n} \times \frac{n-1}{2p}$$

where $n$ is the number of pole members of a commutator and $2p$ is the number of magnetic pole members of a stator.

9 Claims, 33 Drawing Figures

CORELESS MOTOR

BACKGROUND OF THE INVENTION

This invention relates to a coreless motor.

In recent years, there has been exploited a coreless motor using an iron-coreless rotor having one or more flat type coils bonded to an insulating substrate. The rotor of this type of motor is prepared by laminating flat spiral coils made of, for example conductive foils or made by printing, on a light insulating substrate formed of, for example, synthetic resin. Because no iron core is used, this motor is light as a whole and its inertial force is small. When, therefore, this rotor is used in a tape-driving motor of, for example, a tape recorder which requires such nature or property, a rotational rise of a capstan shaft at the time when the motor is started, and a tape stop at a prescribed position can be quickly and smoothly effected.

FIG. 2 shows a rotor $R_1$ of a conventional DC commutator-motor wherein the numer $n$ of pole members of a commutator $S_1$ is 5 and the number $2p$ of magnetic pole members of a magnet stator $M_1$ is 2. In FIG. 2, $C_{11}$, $C_{12} \ldots C_{15}$ indicate models of sectorial loop coils and $S_{11}$, $S_{12} \ldots S_{15}$ denote pole members of the commutator $S_1$. The sectorial loop coils $C_{11}$, $C_{12} \ldots C_{15}$ are arranged around a rotary shaft 11 in such a manner as to be mutually lapped into two layers and equidistantly spaced from each other and made flat. The wind-starting end of one of the lapped coils is connected in turn to the wind-terminating end of the other, and these connection points are connected to the pole members $S_{11}$, $S_{12} \ldots S_{15}$ of the commutator $S_1$, respectively. The rotor $R_1$ is disposed in such a manner that the flat surface of its loop coil section is faced to the magnetic pole member surface of the magnet stator $M_1$ having two magnetic pole members. The respective loop coils $C_{11}$, $C_{12} \ldots C_{15}$ are so arranged that the angle $\theta$ of each loop coil flared toward itself from the center of the rotor is specified. That is to say, the angle $\theta_1$ is set as follows from the relation with the number $n$ of pole members of the commutator $S_1$ and the number $2p$ of magnetic pole members of the magnet stator $M_1$.

$$\theta_1 = \frac{360°}{n} \times \frac{n-1}{2p},$$

that is, $\theta_1 = 144°$

Let it be now assumed, in the case of the above-mentioned construction, that brushes contact the pole members $S_{12}$ and $S_{15}$ of the commutator $S_1$, respectively, and current flows in the loop coils $C_{11}$, $C_{12} \ldots C_{15}$ through said brushes. Then the directions in which current flows in the respective loop coils $C_{11}$, $C_{12} \ldots C_{15}$ are as indicated by arrows. In this case, as seen from FIG. 2, at one (shown by A) of the lapped portions of the loop coils current flows in opposite directions to offset the resulting mutual electromagnetic forces. Accordingly, this lapped portion does not contribute to the generation of rotation force of the rotor, which constitutes one of the causes of decreasing the motor efficiency.

SUMMARY OF THE INVENTION

The object of the invention is to provide a highly efficient coreless motor.

According to the invention, there is provided a coreless motor which comprises a rotor having a plurality of flat type loop coils arranged on a rotor substrate, a motor housing, a journal bearing for rotatably supporting said rotor, and a stator, which includes a pair of permanent magnets disposed facing said rotor in said motor housing, characterized in that the angle $\theta$ of said flat type loop coil flared toward itself from the rotor axis is so set as to satisfy an inequality:

$$\theta > \frac{360°}{n} \times \frac{n-1}{2p}$$

where $n$ is the number of pole members of a commutator and $2p$ is the number of magnetic pole members of a stator.

DESCRIPTION OF THE PREFERRED EMBODIMENTS

Figure 1:
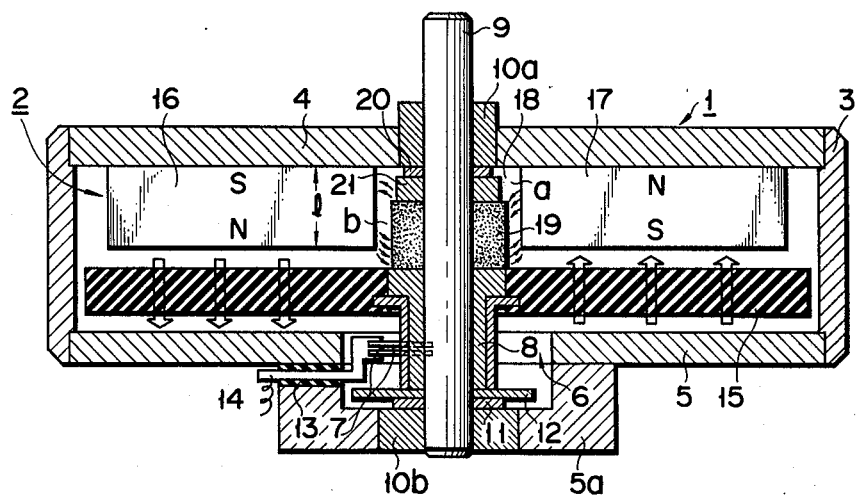
FIG. 1 is a sectional view of a coreless motor according to an embodiment of the invention.
Figure 2:
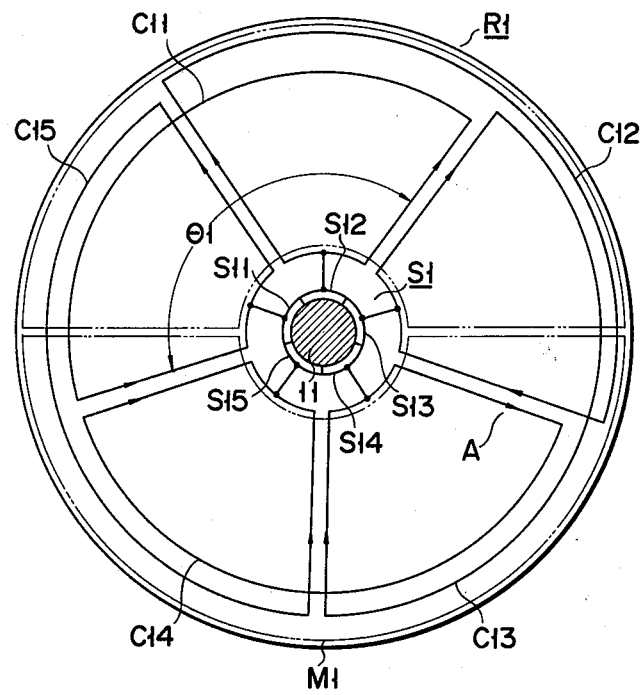
FIG. 2 shows as a model a rotor of a prior art coreless motor.
Figure 3:
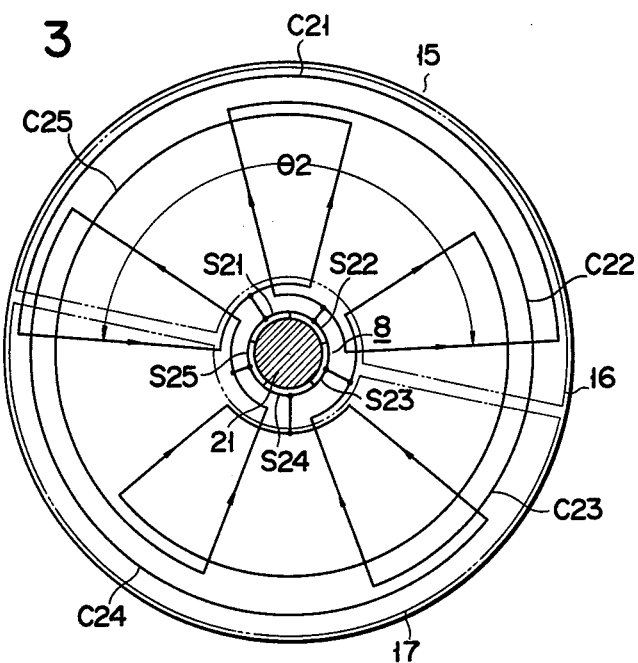
FIG. 3 shows as a model the rotor shown in FIG. 1.
Figure 4:
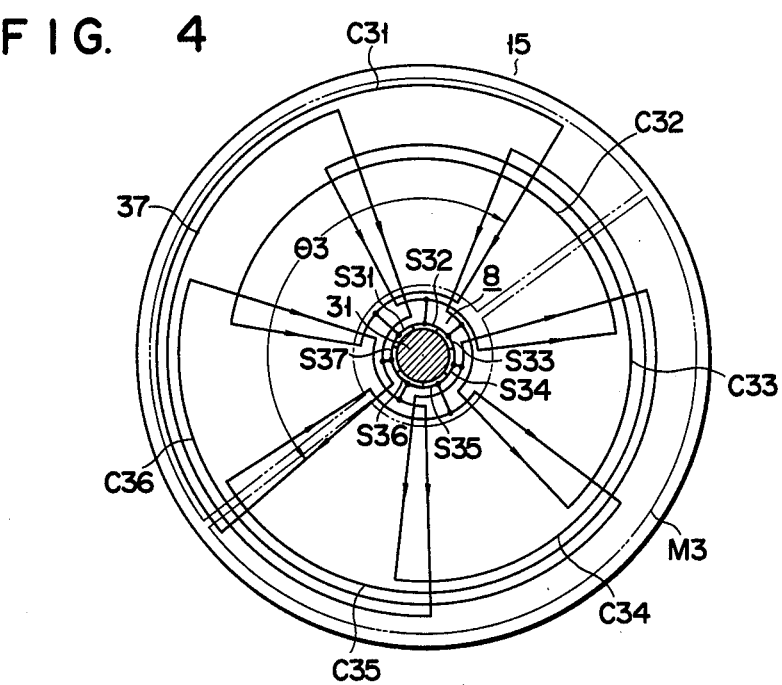
FIG. 4 shows as a model a rotor used in a coreless motor according to another embodiment of the invention.

The whole construction of a coreless motor is first described referring to FIG. 1 and then a loop coil constituting a main part of the invention is described referring to FIGS. 3 and 4.

All of the following embodiments refer to the case where this invention is applied to a coreless motor but this invention can be quite similarly applied also to a generator.

In FIG. 1, a housing 2 of a motor 1 comprises a short cylinder-like outer frame 3, a disc-like upper yoke 4 fixed to an upper end face portion of the outer frame 3, and a disc-like lower yoke 5 fixed to a lower end face portion of the outer frame 3. At the central portion of the outer side face of the lower yoke 5 there is provided integrally with the yoke 5 a cup-shaped receiving member 5a which is upwardly opened. This opening of the receiving member 5a communicates with the interior of the housing 2, and brushes 7 and a commutator 8 are disposed in the resulting chamber 6. Journal bearings 10a, 10b for rotatably supporting a rotary shaft 9 used as an output shaft are mounted at the central portion of the upper yoke 4 and at the central portion of the receiving member 5a made integral with the lower yoke 5, respectively. A thrust-bearing washer 11 and an oil collar 12 are fitted over a portion on the lower journal bearing 10a-side of the rotary shaft 9 which is mounted through the journal bearings 10a, 10b in a manner vertically penetrating through the housing 2. The commutator 8 is secured to a rotary shaft portion located on the upper side from the oil collar 12. The brushes 7 are pressed against the commutator 8. This brush 7 is attached to a brush-support plate 14 attached to the receiving member 5a through electrically insulating member 13, and the brush-support plate 14 itself forms a conductive terminal for being connected to a power source.

Within the housing 2 a coreless rotor 15 is fitted through the commutator 8 to the rotary shaft 9 in a manner made integral with the same 9. Above this rotor 15 are disposed a pair of permanent magnets 16, 17 fixed to the upper yoke 4 in corresponding relation to the rotor 15. The pair of permanent magnets 16, 17 comprise a stator which has a pair of permanent magnet poles (i.e., poles N and S of magnets 16, 17, respectively). A magnetic member 19 secured to the rotor 15 and fitted over the rotary shaft 9 is disposed in a space 18 existing between the rotary shaft 9 and the paired permanent magnets 16, 17 for use as field magnet. This magnetic member 19, in this embodiment, is formed into a cylindrical configuration. Further, with respect to the disposition of the magnetic member 19 it is essential that it is disposed at a position slightly upwardly or downwardly displaced with respect to the width $l$-direction of the permanent magnets 16, 17. In this embodiment, the magnetic member 19 is disposed downwardly displaced with respect to said width $l$-direction by a thrust-bearing washer 20 and a spacer 21 fitted over that portion of the rotary shaft 9 which is displaced toward the upper journal bearing 10a.

Hereinafter, the rotor 15 of FIG. 1 is described referring to FIG. 3. FIG. 3 shows the rotor 15 of the DC commutator-motor wherein the number $n$ of pole members of the commutator is 5 and the number $2p$ of magnetic pole members of a magnet stator $M_1$ is 2. $C_{21}, C_{22} \ldots C_{25}$ indicate as models sectorial loop coils and $S_{21}, S_{22} \ldots S_{25}$ denote pole members of the commutator. The sectorial loop coils are arranged around a rotary shaft 9 in such a manner as to be mutually lapped into two layers and equidistantly spaced from each other and made flat. The wind-starting end of one of the lapped coils is connected in turn to the wind-terminating end of the other, and these connection points are connected to the pole members $S_{21}, S_{22} \ldots S_{25}$ of the commutator. The rotor 15 is disposed in such a manner that the flat surface of its loop coil section is faced to the magnetic pole member surfaces of stator magnets 16, 17 having two permanent magnetic poles (N pole, S pole) respectively. The respective loop coils $C_{21}, C_{22} \ldots C_{25}$ are so arranged that the angle $\theta_2$ of each loop coil flared toward itself from the center of the rotor 15 is specified. That is to say, the $\theta_1$ is set as follows from the relation with the number $n$ of pole members of the commutator and the number $2p$ of magnetic pole members of the stator magnets 16, 17.

$$\theta_2 > \frac{360°}{n} \times \frac{n-1}{2p},$$

that is, $\theta_2 > 144°$ (In FIG. 3, $\theta_2 \approx 175°$).

Let it be now assumed, in the case of the above-mentioned construction, that the brushes contact the pole members $S_{22}$ and $S_{24}$ of the commutator, respectively, and current flows in the loop coils $C_{21}, C_{22} \ldots C_{25}$ through said brushes. Then, the directions in which current flows in the respective loop coils $C_{21}, C_{22} \ldots C_{25}$ are as indicated by arrows. In this case, as seen from FIG. 3, at any one of the lapped portions of the loop coils current flows in the same direction, so that the electromagnetic forces of the lapped loop coils cooperatively act on each other to contribute to the generation of rotation force of the rotor. As a result, the motor efficiency is remarkably increased as compared with that attainable with the prior art case.

FIG. 4 shows the rotor 15 of a coreless motor according to another embodiment of the invention wherein the number $n$ of pole members of the commutator 8 is 7 and the number $2p$ of magnetic pole members of the stator magnets 16, 17 is 2. $C_{31}, C_{32} \ldots C_{37}$ indicate as models sectorial loop coils and $S_{31}, S_{32} \ldots S_{37}$ denote pole members of the commutator. The positional relations between the pole members $S_{31}, S_{32} \ldots S_{37}$ and between these pole members and a rotary shaft 31, the positional relation between the rotor 15 and the stator magnets 16, 17, and the commutator 8 are the same as those in the preceding embodiments, and detailed description thereof is omitted.

The respective loop coils $C_{31}, C_{32} \ldots C_{37}$ are so arranged that the angle $\theta_3$ of each loop coil flared toward itself from the center of the rotor 15 is specified. That is to say, the $\theta_1$ is set as follows from the relation with the number $n$ of pole members of the commutator 8 and the number $2p$ of magnetic pole members of the stator magnets 16, 17.

$$\theta_3 > \frac{360°}{n} \times \frac{n-1}{2p},$$

that is, $\theta_3 > 155°$ (In FIG. 3, $\theta_3 \approx 160°$).

Let it be now assumed, in the case of the above-mentioned construction, that the brushes contact the pole members $S_{31}$ and $S_{34}$ of the commutator 8, respectively, and current flows in the loop coils $C_{31}, C_{32} \ldots C_{37}$ through said brushes. Then, the directions in which current flows in the loop coils $C_{31}, C_{32} \ldots C_{37}$ are as indicated by arrows. In this case, as seen from FIG. 4, at any one of the lapped portions of the loop coils current flows in the same direction, so that, as in the preceding embodiment, the electromagnetic forces of the lapped loop coils cooperatively act on each other to contribute to the generation of rotation force of the rotor. As a result, the motor efficiency can be raised.

As described in deatil, from the relation with the number $n$ of pole members of the commutator and the number $2p$ of magnetic pole members of the stator magnet, the angle $\theta$ of each of the sectorial loop coils arranged in odd number around the rotary shaft is so set as to satisfy the inequality:

$$\theta > \frac{360°}{n} \times \frac{n-1}{2p}$$

and if, under this condition, arrangement is so made that, as mentioned above, at any one of the lapped portions of the loop coils current flows in the same direction, the electromagnetic forces of the lapped loop coils cooperatively act on each other to contribute to the generation of rotation force of the rotor. As a result, a highly efficient DC commutator motor can be provided.

Hereinafter, the operation of the coreless motor as a whole shown in FIG. 1 is described. When it is now assumed that current be supplied to the motor 1 through the conductive terminal, the coreless rotor 15 disposed in the main fields of the permanent magnets 16, 17 is rotated in accordance with the principle described in connection with FIGS. 3 and 4 to cause the rotary shaft 9 to be rotated. Part of said main fields acts also on the magnetic member 19 as shown by arrows $a$ and $b$ to magnetize the magnetic member 19, so that there is produced a force causing the magnetic member 19 to be attracted inwardly of the space 18. When this force is produced, the rotor 15 integral with the magnetic member 19 is displaced toward the upper journal bearing 10a and is disposed at said displaced position in which the rotor 15 is always pressed toward the upper journal bearing 10a. Accordingly, the rotor 15 at this displaced position rotates smoothly without being vibrated in a direction in which a thrust acts.

In the preceding embodiments, the magnetic member 19 was so magnetized as to be attracted inwardly of the space 18, but may be magnetized in such a direction as to permit the magnetic member 19 to pop out into the outer side of the space 18 from the inner side thereof, that is, in such a direction as to permit the magnetic member 19 to be repulsive against the main field. In this case, the rotor is of course displaced in a direction pressed toward the lower journal bearing 10b.

The rotary shaft is completely prevented from being minutely vibrated in the thrust direction, simply by additionally providing the magnetic member and causing part of the main field to act on this member.

Figure 5:
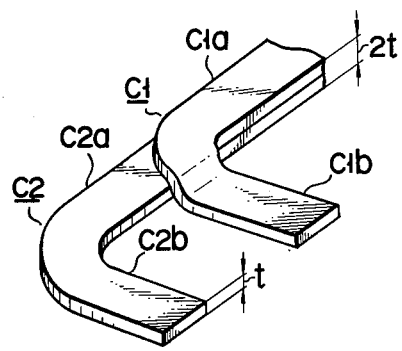
FIG. 5 is a perspective view showing the condition in which two loop coils are lapped.

FIG. 5 shows the condition in which two loop coils $C_1$, $C_2$ having a thickness of $t$ are lapped as shown in FIGS. 3 and 4, said thickness being the one as viewed in a direction in which the magnetic flux acts. As seen, the whole of these two loop coils has a thickness of $2t$. When, in order to decrease this thickness, effective coil portions $C_{1b}$, $C_{2b}$ are arranged flush with each other except for coil end portions $C_{1a}$, $C_{2a}$, the effective coil portions $C_{1b}$, $C_{2b}$ have a thickness of $t$. Since, however, said loop coils are lapped at the coil end portions $C_{1a}$, $C_{2a}$, it is naturally impossible to arrange them in a manner that they are flush with each other. As a result, it is impossible to decrease the thickness of the whole of the two loop coils as viewed in said magnetic flux-direction.

The coil end portions are disposed concentric with that rotary shaft of the motor to which the rotor is fitted, and therefore do not act so as to cut the magnetic flux of the magnet stator when the rotor is rotated. Accordingly, these coil end portions do not contribute to the generation of rotation force of the rotor. In order to elevate the rotation efficiency of the rotor, accordingly, the magnet stator and the yoke have simply to be disposed close to the rotor at said effective coil portions $C_{1b}$, $C_{2b}$ thereof.

Figure 6:
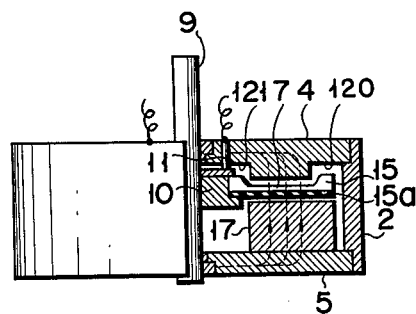
FIG. 6 is a half-sectional view of a coreless motor using a rotor having the loop coils of FIG. 5.

In FIG. 6, the same parts and sections as those of FIG. 1 are denoted by the same reference numerals. Within the housing 2 the rotor 15 and the stator magnets 16, 17 are received, and a front housing 4 and a rear housing 5 are designed to function as an upper yoke and a lower yoke, respectively, which constitute magnetic paths of the stator magnets 16, 17.

Figure 7:
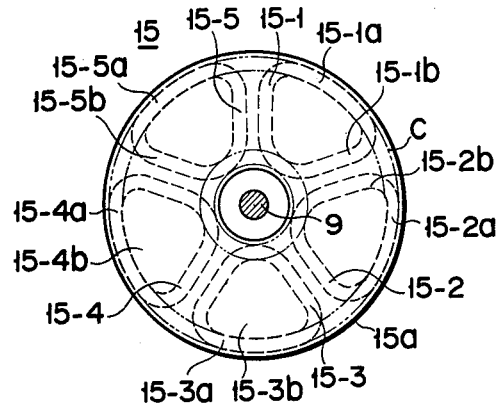
FIG. 7 is a plan view of the rotor shown in FIG. 6.

FIG. 7 shows the rotor 15 of FIG. 6. That is, around the rotary shaft 9 a plurality of flat loop coils $C_1, C_2 \ldots C_5$ are annularly arranged. The loop coils $C_1$ to $C_5$ are each a sectorial one made of conductive foil or made by printing. The respective coil end portions of these loop coils $C_1$ to $C_5$ are mutually lapped similarly to FIG. 5, while the respective effective coil portions thereof are arranged in cohering relation to the rotor substrate 15a and in flush relation with each other, and the height of the effective coil portions is made smaller than that of the coil end portions.

In the inner face of the front housing 4 opposed to the coil face of the rotor 15 are formed escapement portions 120, 121 in such a manner that they are respectively annularly depressed in corresponding relation to the coil end portions of said coil face. An annular portion of the front housing 4 between the escapement portions 20, 21 is arranged to approach the effective coil portions except for the coil end portions of the coils $C_1$ to $C_5$.

Since construction is made as such, the magnetic flux of the stator magnets 16, 17 is passed through a magnetic path formed along the front housing 4, rotor 15 and rear housing 5 as shown by broken lines in FIG. 6. Since, at this time, said inner face of the front housing 4 opposed to the coil face of the rotor 15 is formed with the annular escapement portions 120, 121 in corresponding relation to the coil end portions of the coils $C_1$ to $C_5$, said annular portion of the front houusing 4 can be made close to the effective coil portions of the coil face, thereby enabling the stator magnets 16, 17 to approach the front housing 4, i.e., upper yoke to decrease a space portion formed in the magnetic path between said stator magnets 16, 17 and the front housing 4. Thus can be increased the rotation efficiency of the rotor 15.

Figure 8:
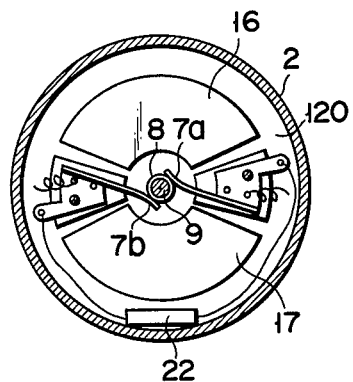
FIG. 8 is a plan view showing the condition in which noise or spark-preventing parts are attached within an escapement section.

In the embodiment of FIG. 6, the coil end portions of the rotor 15 are projected into the escapement portions 120, 121. As shown in FIG. 8, however, a spark-preventing capacitor 22 for the commutator can be inserted into these escapement portions. Terminals of the capacitor 22 are connected to brushes 7a, 7b.

Figure 9:
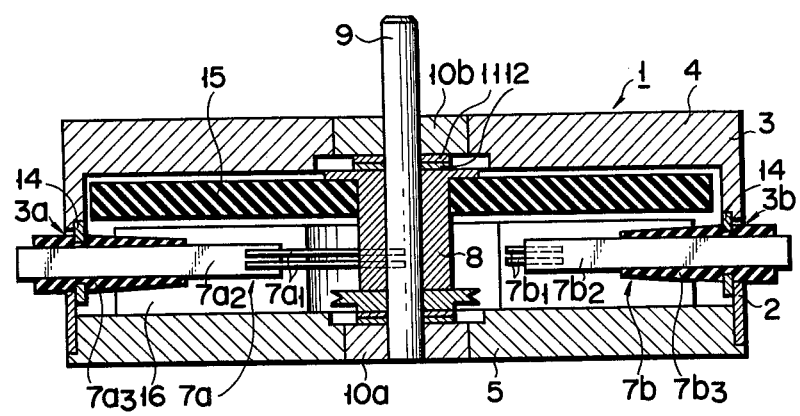
FIG. 9 is a sectional view of a coreless motor according to another embodiment of the invention.
Figure 10:
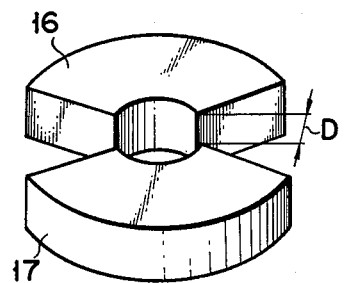
FIGS. 10 and 11 are each a perspective view of a permanent magnet-stator used in the coreless motor of FIG. 9.

In FIGS. 9 and 10, a space D is provided between the stator magnets 16, 17 in which are disposed the brushes 7a, 7b which face each other from both right and left sides. The brushes 7a, 7b comprise, for example, flexible conductive sliding sections 7a1, 7b1, conductive support members 7a2, 7b2 to which said sliding sections are secured, and insulating holding members 7a3, 7b3 to which the base portions of said support members are secured (see FIG. 12), respectively. The base portions of the brushes 7a, 7b, that is, the holding members 7a3, 7b3 are inserted from inside of the housing 2 into brush-insertion holes 3a, 3b bored in the outer frame 3 in corresponding relation to both opposite ends of said space D, so that the sliding sections 7a1, 7b1 may flexibly abut on the peripheral surface of the commutator 8. In FIG. 9, the sliding section 7b1 of one brush 7b is omitted at its halfway portion for convenience.

Figure 12:
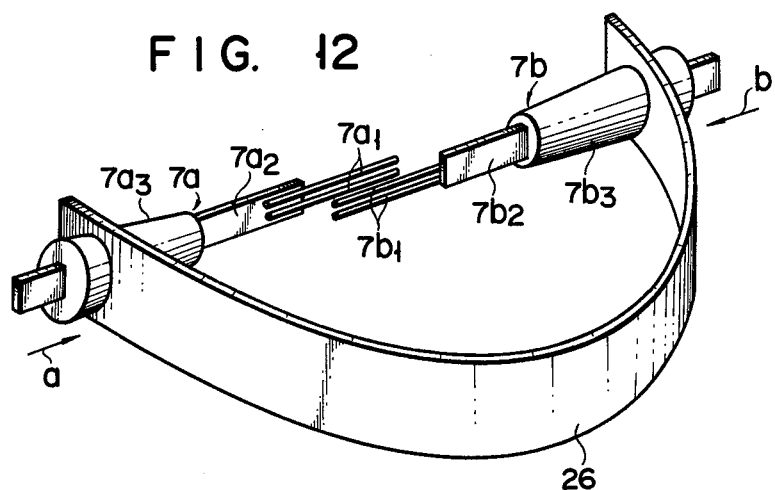
FIG. 12 is a perspective view of a commutating brush-holding device of the coreless motor of FIG. 9.

As shown in FIG. 12, the base portions of the holding members 7a3, 7b3 of both brushes 7a, 7b are fitted, respectively, into both end portions of a semicircular brush-holding band 26 having the tendency to be always widened. This band 26 is flexibly retained in a manner pressed against the inner wall surface of the outer frame 3 due to its elastic force.

Figure 11:
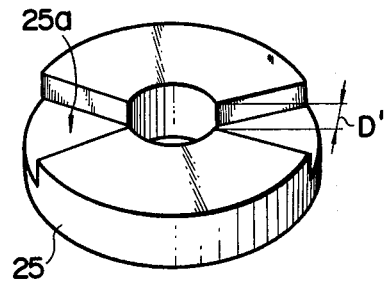

The base portions of the brushes 7a, 7b, in assembling the flat type compact motor 1, are flexibly inserted from inside of the outer frame 3 into the brush-insertion holes 3a, 3b by pressing the brush-holding band 26 in directions indicated by arrows a and b. In this case, since the band 26 is allowed to abut against the inner face of the outer frame 3 of the housing 2 due to its own widening tendency or property, it is stably held in place without the aid of particular fixing means. Note that the brush-holding band 26 can be formed of metal or synthetic resin. Further, as shown in FIG. 11, in substitution for the above-mentioned separate permanent magnets 16, 17 can be used a single disc-like permanent magnet 25 in which a grove 25a is formed to provide a space D' corresponding to said space D shown in FIG. 10.

Figure 13:
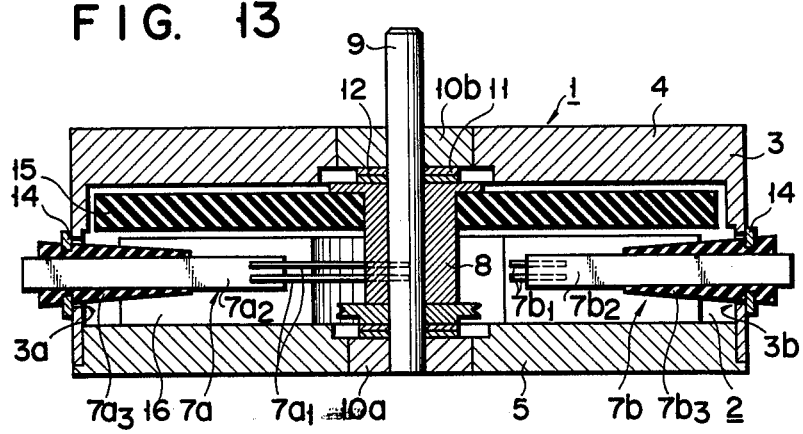
FIG. 13 is a sectional view of a coreless motor according to another embodiment of the invention.

In FIG. 13, the brushes 7a, 7b are inserted from outside the housing 2 into the same 2 through the brush-insertion holes 3a, 3b bored in the outer frame 3 in corresponding relation to both opposite ends of the space D so as to permit the sliding sections 7a1, 7b1 to flexibly abut against the peripheral surface of the commutator 8.

Figure 14:
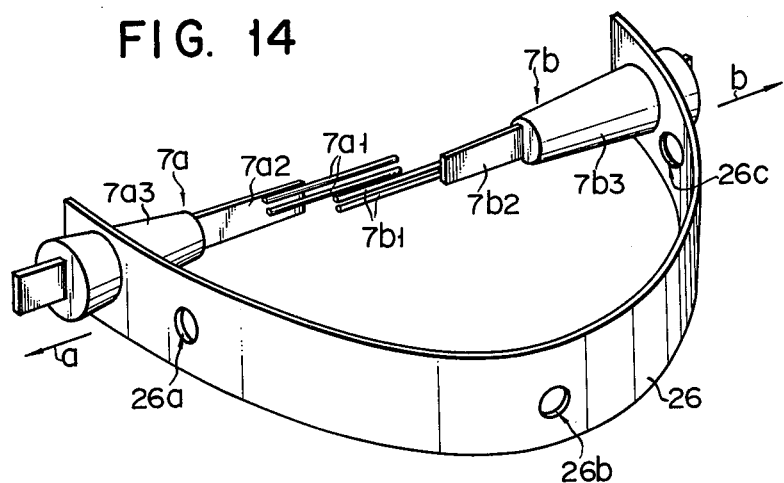
FIG. 14 is a perspective view of a commutating brush-holding device of the coreless motor of FIG. 13.

As shown in FIG. 14, the base portions of the holding members 7a3, 7b3 of the brushes 7a, 7b are fitted, respectively, into both end portions of the flexible semicircular brush-holding band, and these holding members 7a3, 7b3 are flexibly retained on the outer frame 3 by said band 26.

The brushes 7a, 7b, in assembling the flat type compact motor 1, are flexibly inserted from outside of the outer frame 3 into the brush-insertion holes 3a, 3b by widening the brush-holding band 26 in directions indicated by arrows a and b. This band 26 is fixedly retained on the outer frame 3 by being screwed to the outer frame 3 through band-fixing holes 26a, 26b, 26c.

In the motor 1 shown in FIGS. 9 to 14 which has the foregoing construction, by connecting a power source to the respective external projecting ends of the conductive support members 7a2, 7b2 the rotor 15 is rendered conductive through the sliding sections 7a1, 7b1 and the commutator 8, and by magnetic cooperation of this rotor 15 with the permanent magnets 16, 17 the rotor 15 is rotated to cause the rotary shaft 9 to be rotated.

As above described, the brushes 7a, 7b are reliably held in place by the brush-holding band 26, so that the simplification of the motor-assembling operation and the brush-holding after completion of this operation are respectively smoothly achieved. The construction of the brushes 7a, 7b can be modified as required, and further the manner and place in which and where the brush-holding band 26 is fixed to the housing 2 can also be properly altered.

Figure 15:
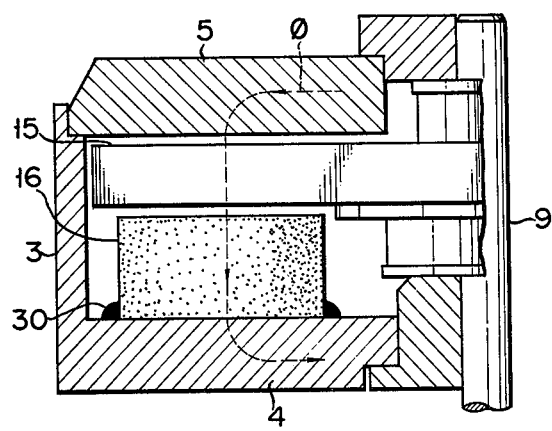
FIG. 15 is a sectional view showing the condition in which the permanent magnet-stator of the coreless motor of the invention is attached to the motor housing.
Figure 16:
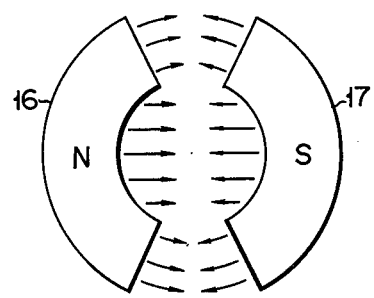
FIG. 16 is a schematic view showing attractive forces acting between two sectorial permanent magnets constituting a stator.

As shown in, for example, FIG. 15, the stator magnet in the preceding embodiments is mounted by bonding the lower end portion of the side face of the stator magnet 16 to the upper face of the yoke 4 by using an adhesive or bonding agent 30. By the way, since, as shown in FIG. 16, the two stator magnets 16, 17 are bonded close to each other in a manner that one of them, i.e., an N pole magnet faces the other, i.e., an S pole magnet, a magnetic attractive force acts on one magnet from the other. Accordingly, before the solidification of the bonding agent, the magnets 16, 17 are moved in directions approaching each other due to the action of said attractive force. That is, in order to bond the magnets 16, 17 to the yoke 4 at a fixed position, the magnets 16, 17 have to be fixedly kept at said fixed position until the bonding agent is solidified, resulting in an increase in manufacturing time. The following description made referring to FIGs. 15 to 21 concerns solutions to such problem.

Figure 17:
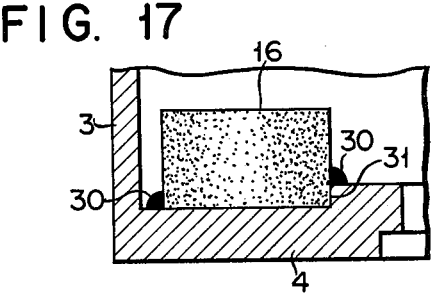
FIG. 17 is a sectional view showing another condition in which the permanent magnet-stator is attached to the motor housing.

To explain one solution shown in FIG. 17, a stepped portion 31 is formed in the yoke 4 as an engagement portion for engaging a side face portion of the stator magnet 16 opposed to the stator magnet 17 to prevent the stator magnet 16 from being moved toward the stator magnet 17. With said side face of the stator magnet 16 allowed to engage said stepped portion 31, the stator magnet 16 is fixedly located on the yoke 4, and the bonding agent 30 is thereafter adhered between the side face of the stator magnet 16 and the yoke 4. This bonding agent 30 is solidified to secure the stator magnet 16 to the yoke 4.

Figure 18:
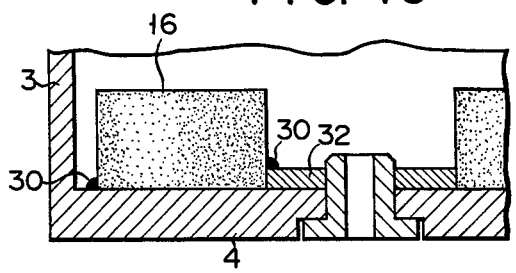
FIG. 18 is a sectional view showing another condition in which the permanent magnet-stator is attached to the motor housing.

In another solution shown in FIG. 18, an annular spacer 32 as a separate member from the yoke 4 is disposed as said engagement portion at the central part of the yoke 4, and with the inner side-face of the stator magnet 16 allowed to engage the outer peripheral surface of the spacer 32 the stator magnet 16 is fixedly situated on the yoke 4. The stator magnet 16 and spacer 32 are secured to the yoke 4 by using the bonding agent 30. Even in the case of such a construction, similar action and effect to those in the solution shown in FIG. 17 are obtained.

Figure 19:
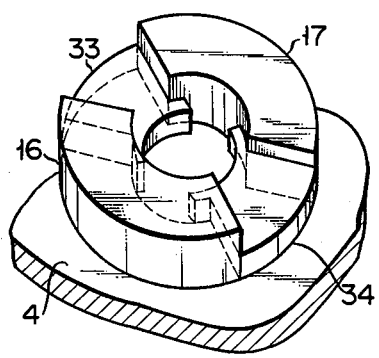
FIG. 19 is a perspective view showing another condition in which the permanent magnet-stator is attached to the motor housing.

In another solution shown in FIG. 19, synthetic resin spacers 33, 34 inserted between the side-end faces of the stator magnets 16, 17 are used as said engagement portion. Also in this case, similar action and effect as those in said solutions of FIGS. 17 and 18 are obtained. In that case, the spacers 33, 34 may of course be bonded to the yoke 4 jointly with the stator magnets 16, 17, but in this case the spacers 33, 34 may be dismembered after the bonding agent 30 for bonding and securing the stator magnets 16, 17 to the yoke 4 is solidified to remove a fear of the stator magnets 16, 17 being displaced.

Figure 20:
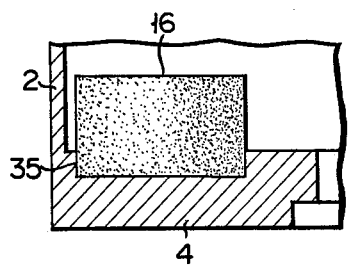
FIGS. 20 and 21 are each a sectional view showing another condition in which the permanent magnet-stator is attached to the motor housing.
Figure 21:
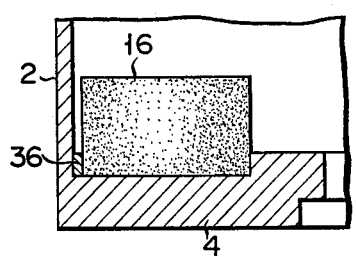

Further solutions shown in FIGS. 20 and 21 are applied to the case where the stator magnet 16 is inwardly moved due to the action of the attractive force between the stator magnet 16 and the stator magnet 17, and because of a small distance between the outer side face of the stator magnets 16, 17 and said outer frame 3 or the side wall section 3 of the yoke 4 there is a fear that the stator magnets 16, 17 are moved toward the side wall section 3. In the solution of FIG. 20, the movement of the stator magnet 16 toward the side wall section 3 is prevented by forming in the yoke 4 another engagement portion 35 for engaging the outer side face of the stator magnet 16, while in the solution of FIG. 21 the movement of the stator magnet 16 toward the side wall section 3 is prevented by inserting a spacer 36 between the side wall section 3 and the outer side face of the stator magnet 16.

The following embodiment is directed to the provision of the coreless motor which is made compact and simple in construction by eliminating the yoke.

Figure 22:
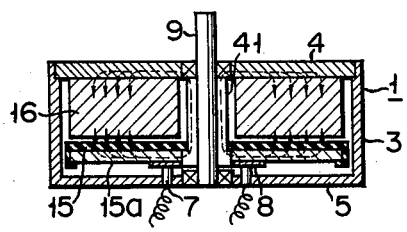
FIG. 22 is a sectional view of a coreless motor whose rotor substrate constitutes part of a magnetic flux.

In FIG. 22, the same parts and sections as those of FIG. 1 are denoted by the same reference numerals, and detailed description thereof is omitted. The rotor 15, as shown in FIG. 7, is constructed such that a plurality of flat loop coils are annularly arranged and adhered onto one flat surface of a disc-like rotary substrate 15a opposed to the stator magnet 16, in a manner that they are mutually lapped, said rotary substrate 15a being made of soft, magnetic material. This rotor is attached through a magnetic material-made sleeve 41 to the rotary shaft 9 rotatably supported across the front and rear housings 4, 5.

If construction is made as such, a magnetic path will be formed, as indicated by broken lines of FIG. 22, in such a manner as to include the stator magnet 16, rotary substrate 15a and sleeve 41, and the loop coils of the rotor 15 are existent in that magnetic path to cause the generation of a rotation force of the rotor 15.

Figure 23:
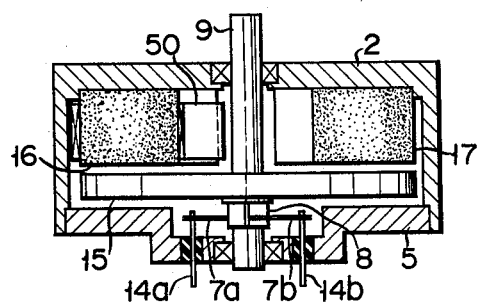
FIG. 23 is a sectional view of a coreless motor according to an embodiment of the invention.
Figure 24:
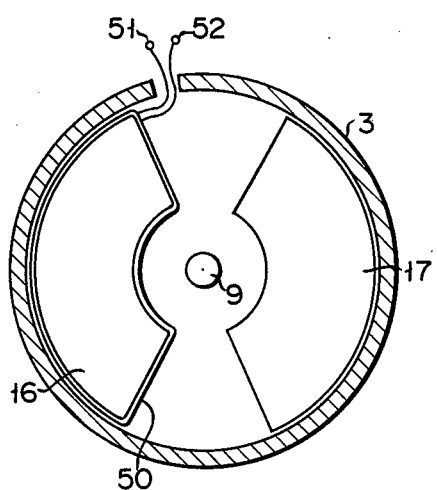
FIG. 24 is a plan view of a stator section of FIG. 23.

In FIG. 23, a rotation signal-generating winding 50 is wound about the outer periphery of the stator magnet 16, and terminals 51, 52 of this winding 50 are drawn out into the exterior as rotation signal-output terminals in an electrically insulated state. The remaining parts and sections are constructed similarly to FIG. 1.

If, in case construction is made as such, a DC voltage is applied between terminals 14a and 14b and current is allowed to flow in the loop coils of the winding rotor 15 through the brushes 7a, 7b and commutator 8, the rotor 15 will rotate in one direction since in said construction a main magnetic flux intersecting the winding rotor 15 at right angles thereto is produced between the stator magnets 16, 17 and the rear housing or lower yoke 5. On the other hand, the respective loop coils of the winding rotor 15 produce a magnetic flux by passage of current through said respective loop coils. Where the intensity of this magnetic flux, i.e., magnetic field is viewed at a specified position intersecting that magnetic flux, said intensity fluctuates proportionally to the rotation of the winding rotor 15. By the way, since the rotation signal-generating winding 50 wound about the stator magnet 16 is situated at a position intersecting the magnetic flux produced by the loop coils of the winding rotor 15 at right angles thereto, an alternating voltage is induced in said winding 50 correspondingly to the fluctuation of said magnetic flux. In other words, since the main magnetic flux passing through the stator magnet 16 is varied with the fluctuation of the magnetic flux produced by the loop coils of the winding rotor 15, an alternating voltage is induced in the winding 50 due to the variation of the main magnetic flux. This alternating voltage becomes a signal whose frequency is proportional to the fluctuation cycle of the magnetic flux produced by the loop coils of the winding rotor 15, that is, proportional to the rotation of the winding rotor 15. If, accordingly, said induced voltage is taken out, as a rotation signal, from the rotation signal-output terminals 51, 52 and this rotation signal is fed back to, for example, a speed control circuit, the rotation speed of the winding rotor 15 can be always kept to be predetermined. Note here that as shown in FIG. 23 the winding 50 can be used also as a spacer functioning similarly to that of FIG. 21. In addition, since the winding 50 is mounted within the housing 2 by being wound about the stator magnet 16, there is no necessity of particularly making the housing size larger, which causes no damage to the characterizing features of the flat type motor.

Figure 25:
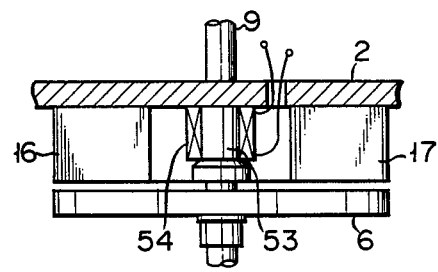
FIG. 25 is a sectional view of a coreless motor according to another embodiment of the invention.
Figure 26:
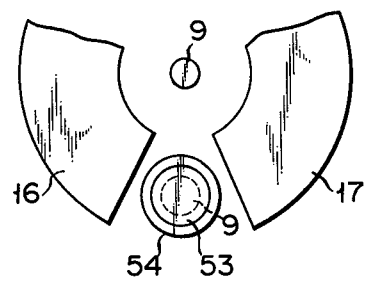
FIG. 26 is a sectional view of a main part of FIG. 25.

The above-mentioned embodiment referred to the case where the rotation signal-generating winding 50 was wound about the stator magnet 16. But also in the case where, as shown in FIGS. 25 and 26, there is particularly provided at an interspace between the side-end faces of the stator magnets 16, 17 an auxiliary yoke 53 whose base end is bonded to the inner bottom of the housing 2 and whose tip end is disposed close to the inner side face of the winding rotor 15, and a rotation signal-generating winding 54 is wound about this auxiliary yoke 53, a rotation signal can be obtained similarly to the above-mentioned embodiment. Further, since, in this case, the winding 54 is disposed at an interspace between the stator magnets 16, 17, the housing 2 does not have to be particularly made large in size. That is, similar action and effect to the above-mentioned embodiment can be obtained.

Figure 27:
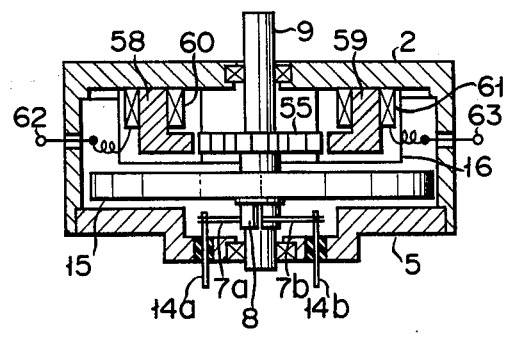
FIG. 27 is a sectional view of a coreless motor according to another embodiment of the invention.
Figure 28:
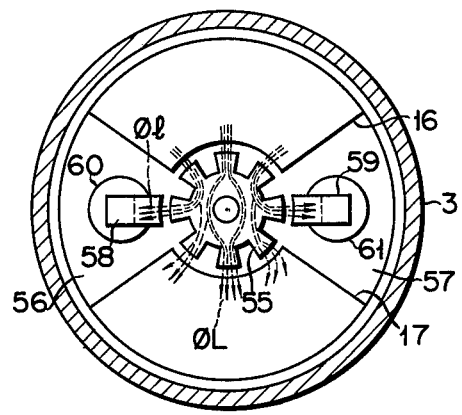
FIG. 28 is a sectional view of a stator section of FIG. 27.

FIGS. 27 and 28 show a coreless motor according to another embodiment of this invention. Between stator magnets 16 and 17, a speed signal generating rotor 55 is mounted on a rotating shaft 9 on a magnet stator side. The rotor 55 is made of magnetic material and indented around the periphery to provide a gear-like configuration which confronts the side surface of the stator magnets 16 and 17.

Between the stator magnets 16 and 17 within a casing 2 are defined spacings 56 and 57. A pair of auxiliary yokes 58 and 59 are disposed one within each of the spacings 56 and 57 and have their base end bonded to the inner surface of the casing 2. The free ends of the auxiliary yokes 58 and 59 oppositely face the indented periphery of the rotor 55. Rotation signal generating coils 60 and 61 are wound around the periphery yokes 58 and 59, respectively. The ends of the coils 60, 61 are taken, as rotation signal output terminals 62 and 63, out of the casing 2.

Since a main magnetic flux is created in a direction vertical to the rotor 15 and between the stator magnets 16, 17 and a covering plate 5, if a DC current is applied, for example, between terminals 14a and 14b to cause current to be passed through an armature coil of the rotor, the rotor 15 is rotated in one direction and in consequence the above-mentioned embodiment is operated as a motor. A main magnetic path, through which a leak magnetic flux is created, is formed across the rotor 55 and thus between the side surfaces of the stator magnets 16 and 17. A leak magnetic path $\phi_L$ is passed through the main magnetic path. When the rotor 55 is rotated to cause the indented portions to be brought into proximity to the auxiliary yokes 58 and 59, auxiliary magnetic paths for the leak magnetic path are created and some $\phi_l$ of the leak magnetic flux $\phi_L$ is passed through each of the auxiliary yokes 58 and 59.

Since the auxiliary magnetic path is intermittently formed during the rotation of the rotor 55 and thus the rotor 15, magnetic flux $\phi_l$ is intermittently passed through the auxiliary yokes 58 and 59. As a result, an AC current of a frequency proportional to the rotation speed of the rotor 15 is induced through the coils 60 and 61 and is generated, as a rotation signal, across the rotation signal output terminals 62, 63. If the rotation signal is, for example, amplified and fed back to a speed control circuit, it is possible to maintain the rotation speed of the rotor 15 constant.

As the rotor 55, auxiliary yokes 58, 59 and coils 60, 61 are received within the spacing defined between the stator magnets 16 and 17, no extra spacing for these parts is necessary. That is, the rotation signal generating mechanism can be so provided within the spacing between the stator magnets 16 and 17 without impairing the function of the flat-type rotor.

Figure 29:
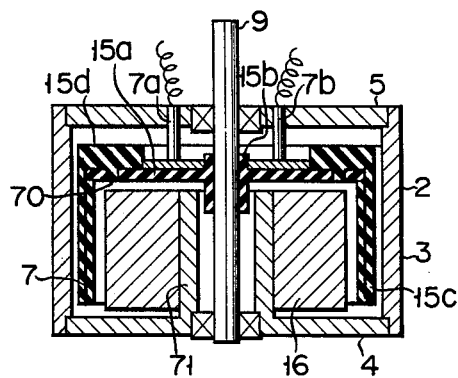
FIG. 29 is a sectional view of a coreless motor having a cup-shaped rotor according to the invention.
Figure 30:
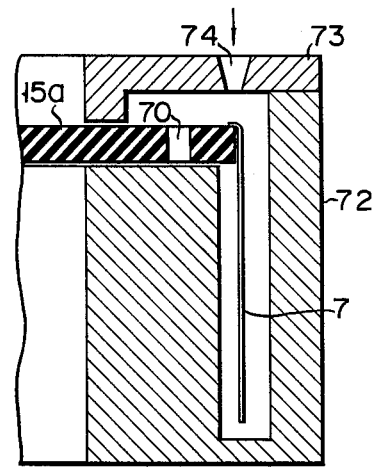
FIG. 30 is a sectional view for explaining part of the manufacturing process for the cup-shaped rotor of FIG. 29.

FIGS. 29 and 30 show another embodiment using a cup-type rotor. A cylindrical armature coil 7 is attached on the periphery of a disc-like insulating rotor substrate having a boss 15b at its central portion by temporarily fixing it on the periphery of the rotor substrate and integrally supporting it with synthetic resin 15d by means of molding. The armature coil 7 has lead wire terminals not shown, to be connected to a commutator and it is taken, along the upper surface of the substrate 15a, out of a housing.

It is desirable that the rotor substrate 15a have a plurality of through bores 70 at its peripheral portion so that the synthetic resin 15d can be filled in the through bore.

The cup-type rotor 15c is mounted, through the boss 15b, on a rotatable shaft 9 which is rotatably supported between upper and lower plates 5 and 4 of the housing. A stator magnet 16 is fitted over a sleeve 71 which projects in a cylindrical fashion from the central portion of the lower plate 4 so as to surround the shaft 9. The periphery, i.e. the pole surface, of the stator magnet 16 oppositely confronts the armature coil 7 of the rotor 15c.

The cup-type rotor 15c is preferably manufactured as follows.

As shown in FIG. 30 the armature coil 7 is temporarily fixed to the peripheral portion of the rotor 15a. After setting a lower mold half 72 so as to cover the depending portion of the armature coil 7, an upper mold half 73 is capped on the lower mold half 72 so that the upper surface of the armature coil 7 is covered. With the lead wire terminals of the armature coil 7 taken, along the upper surface of the substrate 15a, out from the housing, synthetic resin 15d is filled in the form of sol into an inlet 74 in the upper mold half 73 so as to embed the armature coil 7, as well as the peripheral portion of the rotor substrate 15a including the through bore 70, with synthetic resin, which is followed by solidifying. As a result, a rotor as shown in FIG. 29 is formed.

The rotor 15c is so formed integral with synthetic resin 15d with the through bore in the peripheral portion of the upper surface of the rotor 15c being filled with synthetic resin, thus positively attaching the synthetic resin to the rotor substrate 15a. In consequence, the armature coil 7 is securely fixed to the rotor substrate 15a. This obviates the necessity of providing any cylindrical portion for covering the surface of the coil 7, resulting in a simplified rotor structure.

Although with the above-mentioned embodiment the through bore 70 is used in positively attaching the synthetic resin to the peripheral portion of the rotor 15c, this invention is not restricted to this embodiment. For example, any recesses or projections may be provided in place of the through bore 70 in an attempt to securely fix the synthetic resin to the rotor substrate.

As the flat-type armature coil for the above-mentioned coreless motors, use is made of a coil pattern of electroconductive foil or a coil pattern printed on the coil substrate. It is difficult, however, in the flat-type coil to obtain a great number of turns. It is, therefore, required that the rotor be formed by superposing one coil pancake upon another in a multi-layer fashion on a substrate with each coil unit of the coil pancake overlapped with respect to each coil unit of the next adjacent coil pancake. Furthermore, it is necessary to connect each coil unit to a corresponding commutator piece.

Figure 31:
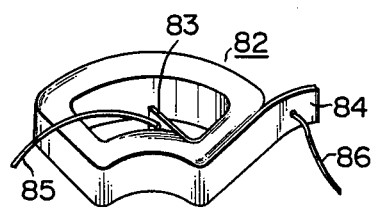
FIG. 31 is a perspective view of another example of a loop coil of the invention.
Figure 32:
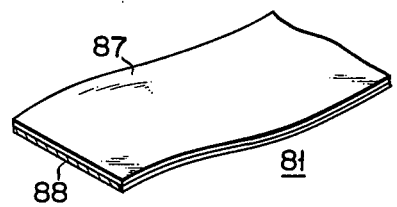
FIG. 32 is a perspective view of part of a strip-like conductor substituting the loop coil of FIG. 31.
Figure 33:
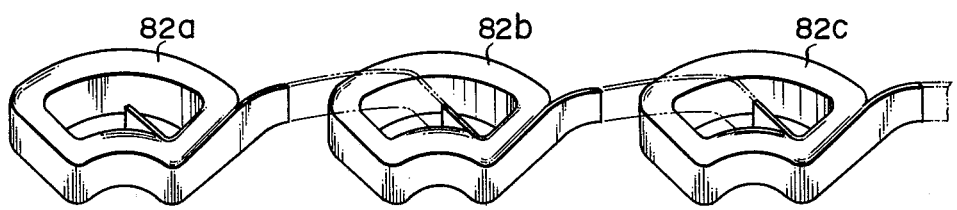
FIG. 33 is a perspective view of an example of an interconnected multi-loop coil.

FIGS. 31 to 33 show an armature coil of the type which can be readily attached to an armature rotor.

FIG. 31 shows the armature coil which is formed by winding a band in a multi-layer fashion upon itself to provide a sectorial configuration with a leading end 83 and tail end 84 connected by means of soldering to lead wires 85 and 86, respectively. As shown in FIG. 32 the band 81 comprises an electroconductive foil 87 and an insulating foil 88 laminated on the electroconductive foil 87.

As the armature coil 82 constitutes a compactly wound multi-layer structure, it can retain its own shape without the necessity of bonding it to any support such as a substrate. It is therefore easy in handling. Since the band 81 is made of a lamination of the electroconductive foil 87 and insulating foil 88, if it is wound upon itself into a coil, the total thickness of the insulating layer so wound can be made one half less than in the case where the insulating foil is bonded to each surface of the electroconductive foil. This permits the coil to be made smaller in size. Furthermore, it is possible to obtain a large number of turns. In the manufacture of the armature coil, therefore, the number of layers of the coil, as well as the number of coil units, can be reduced. It is also possible to easily make a connection between the adjacent coil units, and between the coil unit and each commutator piece, by the use of lead wires.

Although with the above-mentioned embodiment the lead wire is connected for each coil unit, a plurality of coil units may be formed, as an armature coil, in a continuous fashion, as shown in FIG. 33, without the need of individually separating one from the other. In this case, any connection between the adjacent coil units is unnecessary except for an electrical connection at each end of the armature coil, thus making it easier to assemble the armature coil.

What is claimed is:

1. A coreless motor comprising:
    a rotary shaft,
    a rotor mounted on said rotary shaft and having a rotor substrate and a plurality of flat type loop coils disposed on the rotor substrate,
    a motor housing including a magnetic yoke made of a magnetic material and having at least two spaced journal bearings for rotatably supporting said rotary shaft, a stator including a pair of permanent magnetic poles opposed to said rotor within said housing so as to provide a closed magnetic flux path in which a magnetic flux emanated from one pole of said pair of permanent magnetic poles passes through said rotor and yoke and enters into the other pole, and a generally cylindrical thrusting magnetic member attached to said rotor and being located in a space between said rotary shaft and said permanent magnetic poles, said magnetic member being displaceable axially of said rotor by a magnetic flux produced by said permanent magnetic poles of said stator so as to be thrusted toward either of said at least two journal bearings.

2. A coreless motor according to claim 1 wherein said at least two journal bearings are respectively disposed on opposite sides of said rotor.

3. A coreless motor according to claim 1 wherein said generally cylindrical thrusting magnetic member is downwardly displaced relative to said permanent magnetic poles of said stator so that the lower extremity thereof lies below the lower extremity of said permanent magnetic poles of said stator.

4. A coreless motor according to claim 1 wherein said permanent magnetic poles of said stator are bonded by means of a bonding agent to the inner surface of the motor housing used as a yoke.

5. A coreless motor according to claim 1 wherein said motor housing is formed of a magnetic material which is also used as said yoke and has a stepped portion to which a side face portion of each permanent magnetic pole of said stator is engaged.

6. A coreless motor according to claim 1 further comprising an annular spacer disposed on the inner surface of said motor housing, said annular spacer having an outer peripheral surface with which the inner side surface of each permanent magnetic pole of said stator is contacted.

7. A coreless motor according to claim 1 further comprising a pair of spacers located between and contacting the side-end faces of said permanent magnetic poles of said stator.

8. A coreless motor according to claim 1 wherein said motor housing has two recesses into which said permanent magnetic poles of said stator are respectively received.

9. A coreless motor according to claim 1 wherein said motor housing has a side wall section and a stepped portion to which a side face portion of each permanent magnetic pole of said stator is engaged, and further comprising a spacer interposed between the side wall section of said motor housing and the outer side face of said permanent magnetic poles of said stator, to thereby prevent the movement of said permanent magnetic poles of said stator.

* * * * *

UNITED STATES PATENT AND TRADEMARK OFFICE
CERTIFICATE OF CORRECTION

PATENT NO. : 4,093,882
DATED : June 6, 1978
INVENTOR(S) : Kenji FURUTA

It is certified that error appears in the above-identified patent and that said Letters Patent are hereby corrected as shown below:

Column 6, lines 53 and 54, change "20,21" to

--120,121--;

Column 8, line 47, after "yoke 4." change "This" to

--The--;

Column 14 (claim 8), line 17, after "housing has"

delete "two".

Signed and Sealed this

Sixth Day of March 1979

[SEAL]

Attest:

RUTH C. MASON
Attesting Officer

DONALD W. BANNER
Commissioner of Patents and Trademarks